(12) United States Patent
Prikhodko et al.

(10) Patent No.: US 8,918,371 B1
(45) Date of Patent: Dec. 23, 2014

(54) SYSTEMS AND METHODS FOR EVENT LOG COMPENSATION

(71) Applicant: Flexera Software LLC, Itasca, IL (US)

(72) Inventors: Alexander Prikhodko, Campbell, CA (US); David Znidarsic, Palo Alto, CA (US)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 14/287,627

(22) Filed: May 27, 2014

(51) Int. Cl.
G06F 17/00 (2006.01)
G06F 17/30 (2006.01)

(52) U.S. Cl.
CPC ................................. *G06F 17/30371* (2013.01)
USPC ........... 707/691; 707/609; 707/687; 707/722; 707/736; 707/758; 714/100; 706/12; 706/14

(58) Field of Classification Search
CPC ... G06F 11/004; G06F 11/006; G06F 11/008; G06F 11/07; G06F 15/16; G06F 17/30002; G06F 17/3061; G06F 17/30861; G06F 17/40
See application file for complete search history.

(56) References Cited

U.S. PATENT DOCUMENTS

| | | | |
|---|---|---|---|
| 8,341,096 B2* | 12/2012 | Fisher et al. .................... 706/12 |
| 2009/0216698 A1* | 8/2009 | Bouchard et al. ............... 706/46 |
| 2011/0131156 A1* | 6/2011 | Fisher et al. .................... 706/12 |
| 2011/0185234 A1* | 7/2011 | Cohen et al. .................... 714/37 |
| 2012/0036397 A1* | 2/2012 | Balani et al. ............... 714/38.11 |
| 2014/0195492 A1* | 7/2014 | Wilding ........................ 707/684 |

\* cited by examiner

*Primary Examiner* — Hung Le
(74) *Attorney, Agent, or Firm* — Michael A. Glenn; Perkins Coie LLP

(57) ABSTRACT

Various of the disclosed embodiments provide systems and methods to compensate for certain event log errors. For example, when a system fails to record the occurrence of several events (a file closing, a file modification, a network socket opening, etc.) the disclosed embodiments may identify the discrepancy and provide a synthesized event sequence suitable to fulfill the purposes of the event log. In this manner, for example, a client may still be accurately billed for their use of a licensed software or system, even if their usage was punctuated with occasional failures to record their activity.

18 Claims, 13 Drawing Sheets

SYSTEMS AND METHODS FOR EVENT LOG COMPENSATION

FIELD

Various of the disclosed embodiments concern systems and methods to compensate for various event log errors.

BACKGROUND

Many businesses and enterprises have a pressing need to accurately and effectively monitor usage of computer resources. These entities may need to assess their employee's efficiency, determine usage for assessing licensing costs, enforce quotas, etc. One method to monitor usage is through an event log. An event log can be a record of the operations that occur on the system over a period of time (e.g., a local file updated with each read/write/create/delete operation, a remote database with entries reflecting each event, etc.).

Unfortunately, an event log may not always be an accurate record of the events occurring over a period of time. This failure may result for many different reasons, e.g.: an event was not written to the log, perhaps due to a software or hardware failure; an event was deleted from the log after it was written, perhaps due to a file system or network error; an event was corrupted while (or after) being logged; etc. Regardless of the reason for the missing or corrupted event, such an occurrence can make it difficult to understand how the operating system was being used during the monitoring interval. Furthermore, the omission may result in billing difficulties and discrepancies.

Accordingly, there exists a need for systems and methods to determine adjustments to event logs that will facilitate analysis per their original intention, e.g., for billing, for forensic assessments, etc.

BRIEF DESCRIPTION OF THE DRAWINGS

One or more embodiments of the present disclosure are illustrated by way of example and not limitation in the figures of the accompanying drawings, in which like references indicate similar elements.

Figure 1:
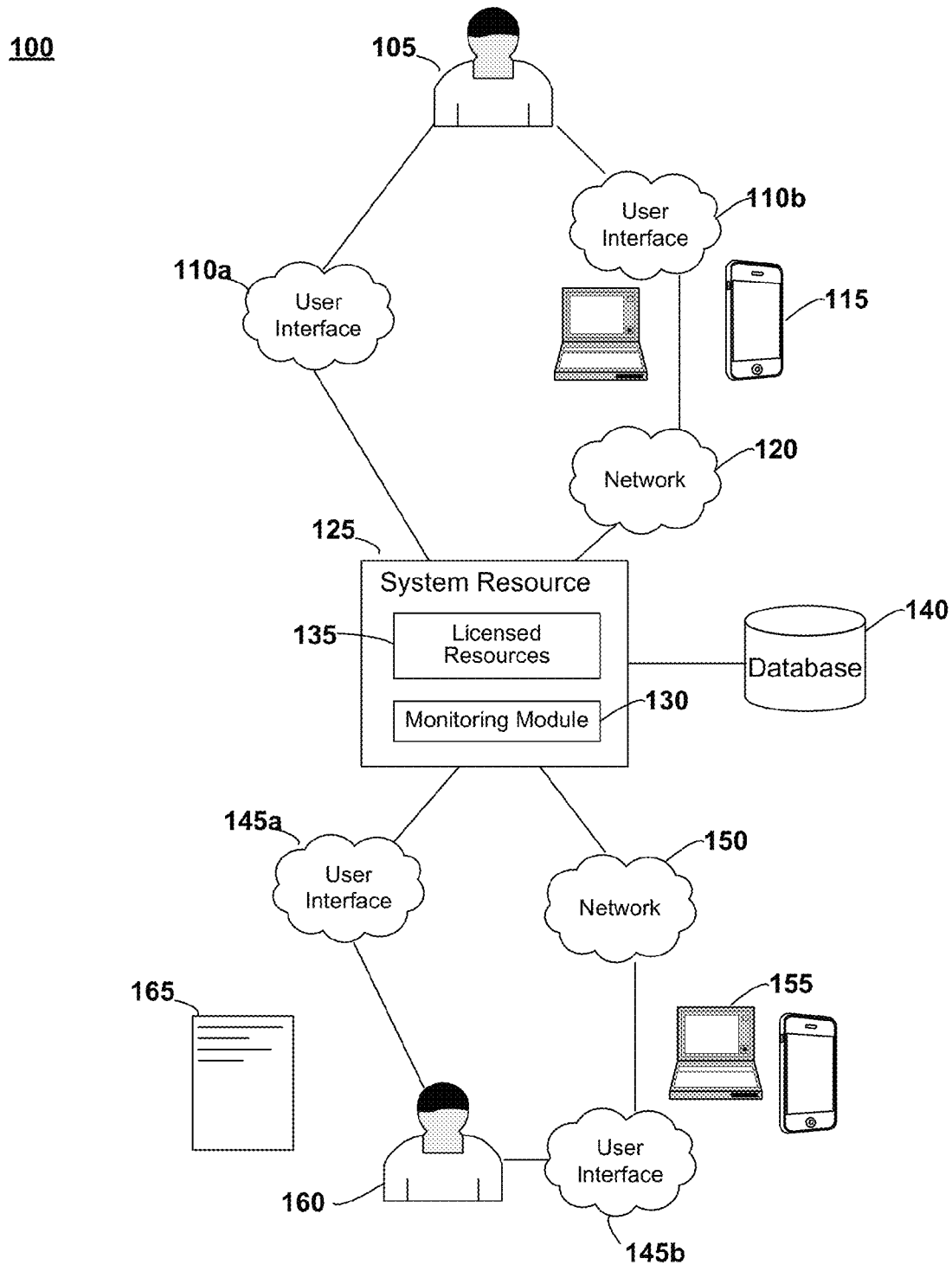
FIG. 1 is an example system topology for using, monitoring, and billing for a software and/or hardware resource as may occur in some embodiments.

Those skilled in the art will appreciate that the logic and process steps illustrated in the various flow diagrams discussed below may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System and Method Overview

Various of the disclosed embodiments contemplate systems and methods for identifying event log errors and for taking appropriate corrective action. Various embodiments contemplate system algorithms by which these missing or corrupted events can be re-created. While it may be preferable to have a complete event log faithfully reflecting the events as they would be recorded absent any error, it is possible that an event log which contains "estimates" of the missing or corrupted events can still be useful, and in some situations may be just as useful, as having a literal record of the actual events. Accordingly, some of the disclosed embodiments may result in an exact replica of the missing records, while others seek only to approximate the effect of the missing record.

System Topology Overview

FIG. 1 is an example system topology for using, monitoring, and billing for a software and/or hardware resource as may occur in some embodiments. A user 105, for example, an employee of an enterprise, may use a system resource 125, directly via an interface 110a or remotely across network 120 via an interface 110b, of a computing device 115. Network 120 may be, e.g., an enterprise local network, an internal network, the Internet, etc.

System resource 125 may be any computing resource having licensed components thereon, e.g., a personal computing system, a server system, a computer mainframe, a remote sensing system, etc. The system resource 125 may include a licensed resource module 135. The licensed resource module 135 may include, e.g., one or more software programs, SDKs, libraries (e.g., dynamic linked libraries DLLs), licensed hardware, etc. A monitoring module 130, such as a software program, may be present to implement various of the monitoring activities described herein. A database 140 may be in communication with the system resource 125 and may be used, e.g., to store transaction logs, records of usage, etc.

While the user 105, or enterprise, may self-report usage of licensed resource(s) 135 in some embodiments, in the depicted example a licensing auditor 160 may monitor the system resource 125, e.g., directly through an interface 145a or across a network 150 (e.g., the same or different network as network 120) via the interface 145b of computing device 155. The licensing auditor 160 may consult the results of monitoring API 130, to generate an usage report 165 used to bill the enterprise or user 105 directly. In some embodiments, the licensing auditor 160 may be a member of the enterprise and may monitor the usage to predict and control costs.

Event Log Estimation

One will recognize that the events in an event log may be in one or more files, databases, or repositories of some other kind. For example, a system may create a log of the events of the day in one file. In this case, the event log is the union of all these daily log files.

Various embodiments contemplate multiple open grammars whose syntax elements (e.g., events) may overlap each other. For example, consider the following events:
1 Fileopen 8:09 pm filehandle1
2 Fileopen 8:20 pm filehandle2
3 Fileclose 8:25 pm filehandle1 (paired with event #1, not #2)
4 Fileclose 8:30 pm filehandle2 (paired with event #2)

Various of the disclosed embodiments generate parse trees from grammar rules to reflect actual occurrences of an anticipated pattern such as that presented above. Various embodiments apply parse trees interleaved within event logs to ascertain event correspondence and event absences. It may be impossible to recreate missing events that don't have any relation to other events (e.g., isolated events with no dependency to or from other events). However, events are often dependent upon other events or are statistically likely to occur in the presence of other events. Therefore, the missing event can be "implied" by the existence of other events and their parameters. Some embodiments use such dependencies and statistical likelihoods to assist in repairing the event log.

Consider the following example of such an event dependency: If the log contains a file "close" event, but not an "open" event for the same file or file handle, it implies that the "open" event is missing or corrupted, because a file "close" cannot happen without a corresponding file "open". An example of a statistical likelihood may be as follows: related event logs indicate that a particular file is opened for an average of 5 seconds each time. Therefore, if the log contains a file "close" event, but not an "open" event for that particular file, a file open event should be not only added to the event stream, but also added with a timestamp 5 seconds before the timestamp of the file close event. These statistical likelihoods may be predetermined by a manager of the system, may be calculated from other event logs, be calculated as the event log is being read, inferred via Bayesian techniques, etc.

Some embodiments tag synthesized events so that they can be later identified, e.g., by another process further in the pipeline, by a human auditor, etc. In some embodiments, if the event is synthesized based on a prior statistical probability, then the tag associated with the event may reflect that probability. Similarly, each timestamp associated with a synthesized event may be tagged so that it can be identified (a single timestamp may suffice depending on how events are structured, e.g., the timestamp may itself be metadata of the event). Some embodiments may tag each estimated timestamp with a list of the possible range (or ranges) from which the estimate was made. Some embodiments may further use checksums to identify errors.

A "grammar" or "grammar rule" as referred to herein, generally encompasses a data structure reflecting a possible ordering of operations. A "parse tree" may refer to a data structure indicating how actual or synthesized events map to a grammar (e.g., the grammar is an abstraction of a pattern and the parse tree is a partial or fully determined occurrence of a pattern derived from real and/or synthesized events). One or more grammars may be used to define an expected sequence of events. Each sequence of events may have its own grammar, and may form a subsequence of a larger grammar. Complex systems may have multiple event sequences occurring in parallel. For example, an event log may contain both file open and file close event pairs as well as network connect and disconnect event pairs. In addition, there may be file open and close event pairs interleaved with other file open and close event pairs. In these cases, there may be one grammar for the file event pairs and one grammar for the network event pairs. To disambiguate interleaved event sequences from the same grammar, rules external to the grammar may be used to link multiple events from the same sequence, as described in greater detail below. For example, an external rule may exist for a single piece of data, like a file handle, that links multiple events from the same sequence or multiple pieces of data that link consecutive events from the same sequence.

fileopen timestamp
    fileopen timestamp
    fileclose timestamp—does this close the first or second fileopen?
    fileclose timestamp As described in greater detail herein, various recovery actions may be taken when an event does not match the current state of a parse tree instance or the event log ends before all parse tree instances are closed.

In some embodiments, multiple grammars may apply to an event and may create joint ambiguity. If this joint ambiguity is possible, some embodiments include a component which changes the log that interleaves events from jointly ambiguous grammars to more than one log, each of these logs containing only grammars which are not jointly ambiguous.

Here is an example of a grammar for file open, read, write, and close events. Note that the value of the filehandle parameter is used to link all the events for one sequence since multiple files may be opened at the same time.

START
    fileopen timestamp filename created_dependent(filehandle)
    FILEOPERATIONS*
    fileclose timestamp linked_dependent(filehandle)
    END
    FILEOPERATIONS→fileread timestamp linked_dependent(filehandle)
    FILEOPERATIONS→filewrite timestamp linked_dependent(filehandle)

Figure 2:
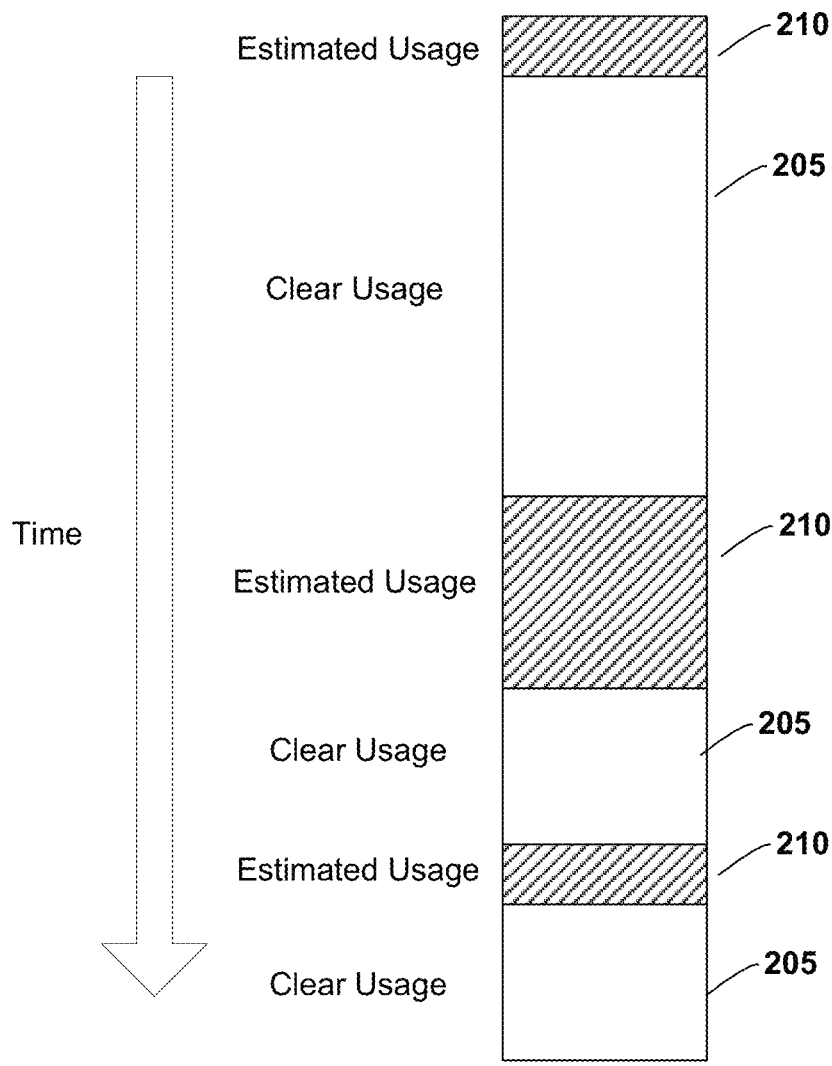
FIG. 2 depicts different portions of an event log file as may occur in some embodiments.

FIG. 2 depicts different portions of an event log file as may occur in some embodiments. The event log 200 may include a plurality of "clear" 205 and "estimated" 210 events over time. The "clear" 205 portions may have no errors. The "estimated" 210 events may result from the application of the processes described herein to cure various lacunae.

Sequential Event Log Example

Figure 3:
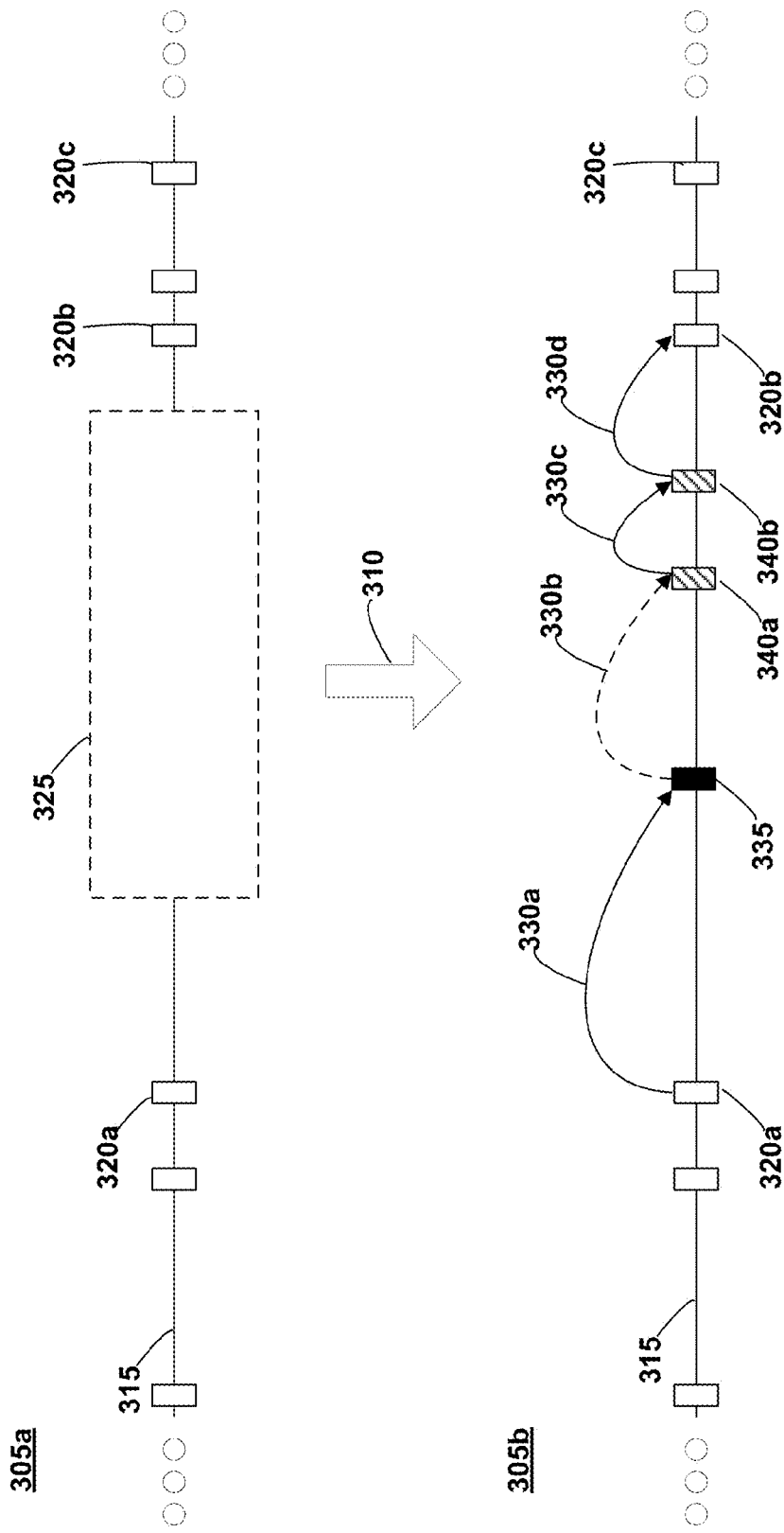
FIG. 3 depicts a sequential event log before and after processing to address a lacuna in the log, as may occur in some embodiments.

FIG. 3 depicts a sequential event log before 305a and after 305b processing 310 to address a lacuna in the log, as may occur in some embodiments. Clear, normal events 320a-c may properly reflect activity on the computer resource. An omission 325 at the indicated period, however, may result in various events failing to be recorded. Following processing 310, "synthetic" antecedent 340a,b and consequent 335 events may be generated.

Antecedent events 340a,b may be generated based upon a determination that a subsequent event depends upon them, e.g., event 320b depends 330d upon event 340b and event 340b depends 330c upon event 340a. Conversely, a consequent event 335 may be generated following a determination that an event, which should occur after a preceding event, does not appear in the record. For example, event 335 depends 330a upon event 320a.

In a sequential event log, a unique timestamp (e.g., a total order) may be attributed to each event. That is, a processor may record the events in real-time, or near real-time, or at least in a manner that makes their succession clearly visible.

Atomized Event Log Example

Figure 4:
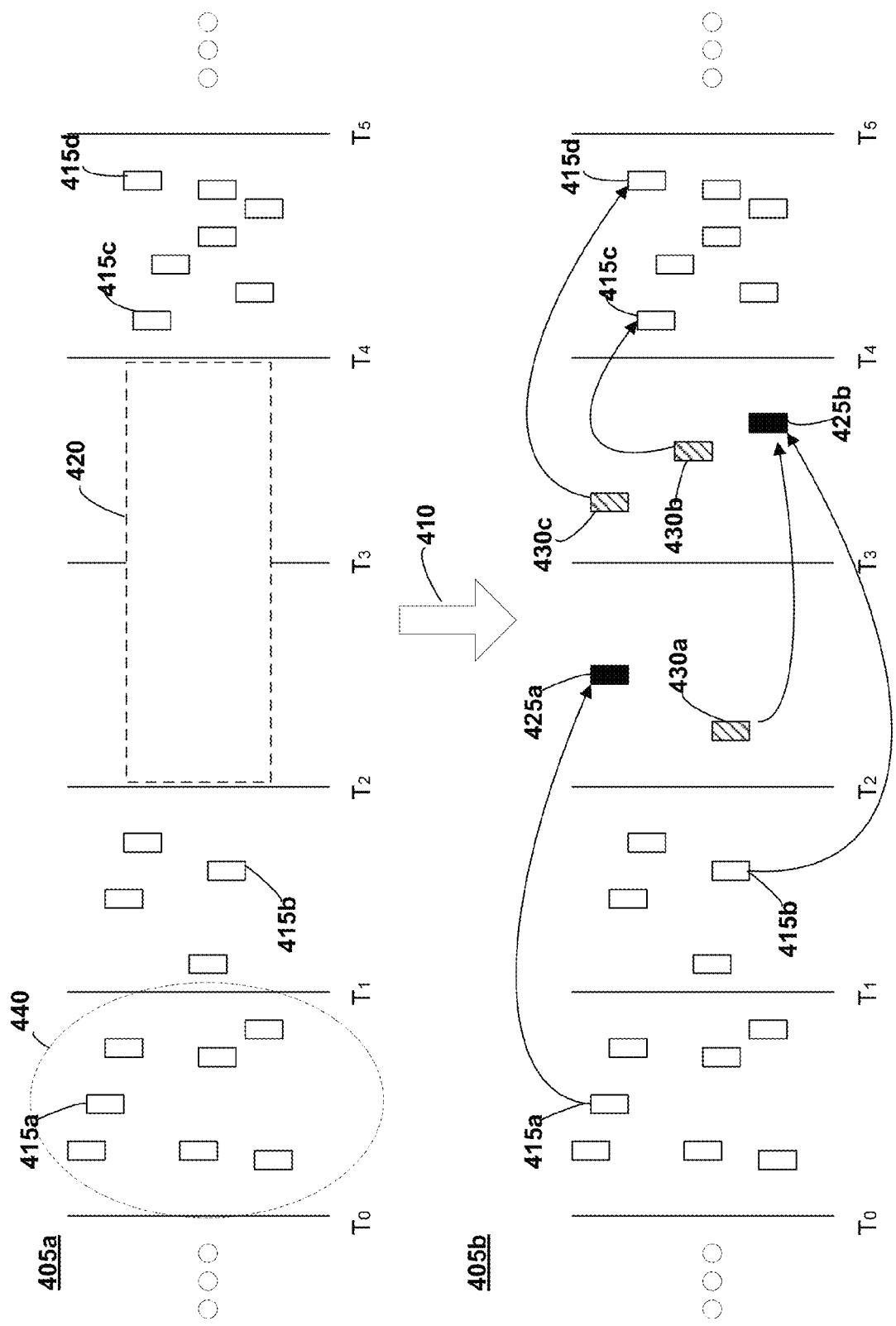
FIG. 4 depicts an atomized event log before and after processing to address a lacuna in the log, as may occur in some embodiments.

In contrast to a sequential event log, FIG. 4 depicts an atomized event log before 405a and after 405b processing 410 to address a lacuna in the log, as may occur in some embodiments. In an atomized event log, events may be grouped into timestamp "buckets", thus forming, e.g., a partial ordering among themselves. For example, all the events in the bucket 440 may be ascribed a single timestamp between $T_0$ and $T_1$. Though depicted here as being in equal divisions, in some embodiments the divisions between buckets may be asymmetric.

Clear, normal events 415a-d may properly reflect activity on the computer resource. An omission 420 at the indicated period, however, may result in the failure of various events being recorded. Following processing 410, synthetic consequent 425a,b and antecedent 430a-c events may be generated. As in the sequential event log example of FIG. 3 the synthetic consequent 425a,b and antecedent 430a-c events may be generated to resolve absent events correlated with normal events 415a-d.

The timestamps for each of the synthetic events 335, 340a, b, 425a,b, 430a-c may be generated with varying levels of fidelity to the normal event that would otherwise have been generated but for omissions 325 and 420. For example, in a system running scientific experiments or an algorithmic banking application, forensic capabilities may be a priority and the grammar rules discussed herein may seek to achieve as accurate a temporal reconstruction of the missing events as possible. Conversely, temporal fidelity in an inventory system may be a lower priority. Accordingly, the grammar rules may be more lax in their allocation of timestamps.

Figure 5:
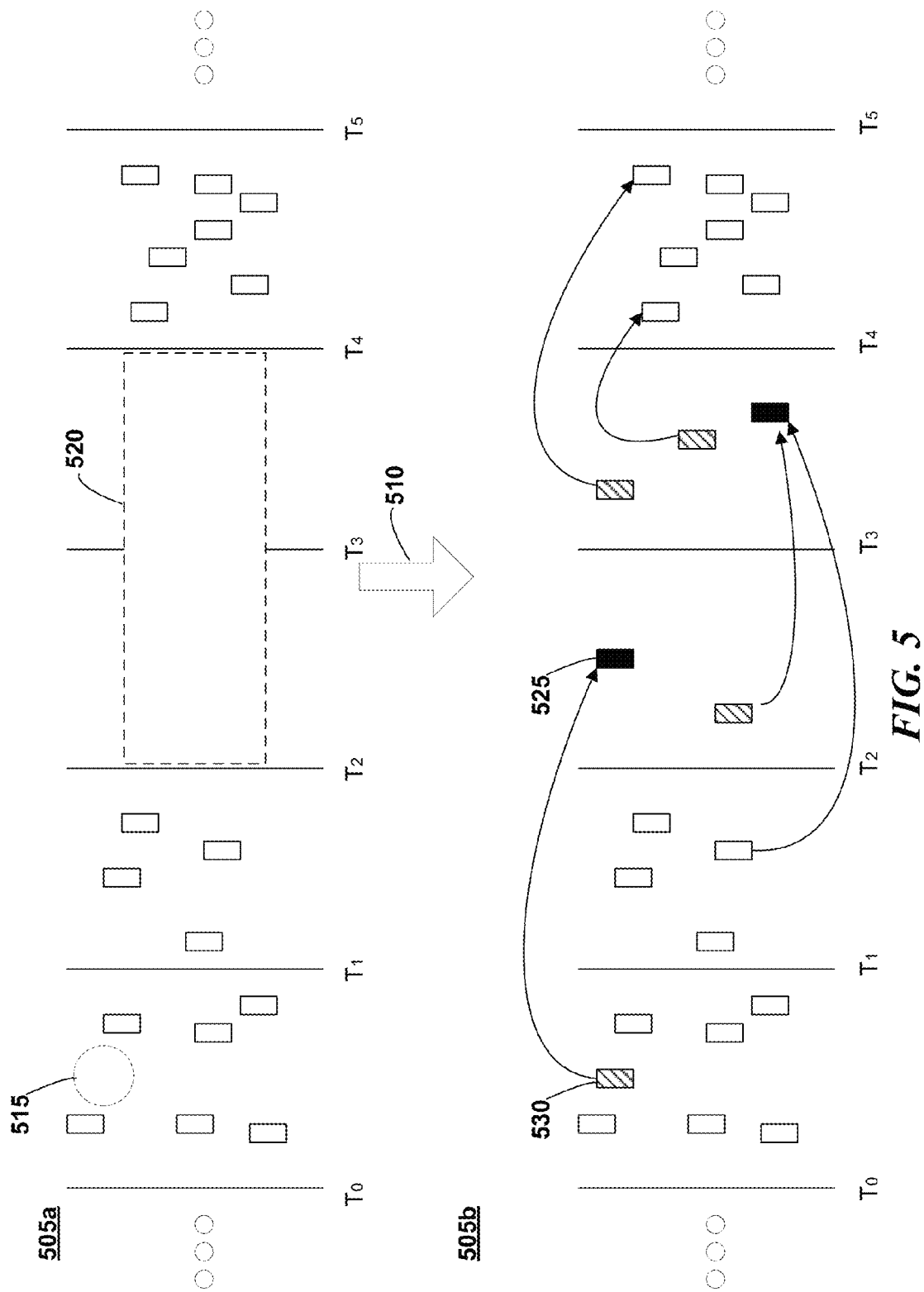
FIG. 5 depicts an atomized event log before and after processing to address a lacuna in the log, including non-local synthetic event creation, as may occur in some embodiments.

Indeed, in some embodiments where fidelity is not highly prioritized, the system may determine during processing that a suitable solution may be achieved by generating "faux events" that may even lie outside an omission region 520. These faux events are referred to as "synthetic non-local events" herein. In FIG. 5, an atomized event log is depicted before and after processing to address a lacuna in the log, including non-local synthetic event creation, as may occur in some embodiments. Following processing 510, in this example, the system has determined that a consequent event 525 is to be created within the region of the omission 520. A simple solution may require that an antecedent event 530 be created, which did not exist 515 in the original log, and indeed, may never have happened. However, if the solution satisfies all the desirable requirements (e.g., perhaps this solution is coeval for billing purposes with a literal record of the events), then some embodiments will proceed to generate the faux events.

Grammar Rule Relations

Figure 6:
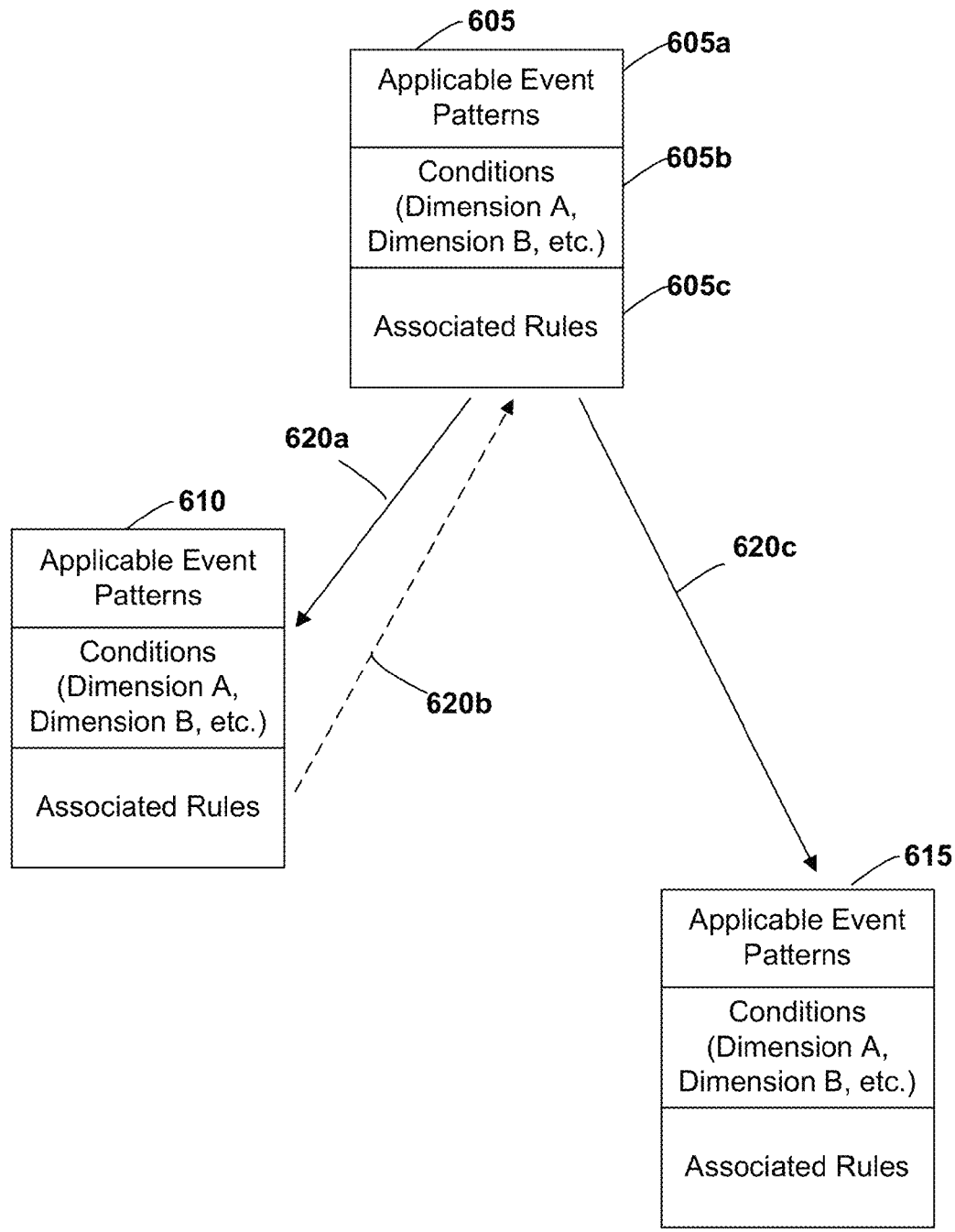
FIG. 6 is a block diagram generally representing components of, and relations between, different grammar objects as may occur in some embodiments.

FIG. 6 is a block diagram generally representing components of, and relations between, different grammar objects 605, 610, 615 as may occur in some embodiments. These grammar objects 605, 610, 615 may be stored in an XML data structure, a SQL database, a JSON structure, or any other manner suitable in the art. Each of the grammar objects 605, 610, 615 may include a representation of the applicable event patterns 605a, conditions 605b across one or more dimensions, and an index of associated rules 605c.

The representation of the applicable event patterns 605a may indicate a series of events expected to follow one another during normal operations of the system. As discussed with respect to FIG. 7, all the patterns of all the grammar rules may be sufficient to encompass all possible, or at least all likely, operations by a user upon a system. Conditions 605b may be used to restrict the character of the synthesized events. For example, one condition may require that a synthesized event occur within a minimum time frame of a preceding normal event. Dimensions other than time may be considered, e.g., available free memory resulting from an operation, processing power that would have been imposed, the user's privileges levels, etc. As an example, conditions may consider the character of the memory available. If there is only one unit of memory available there may be only one way to restore missing allocate memory events, e.g., by allocating and releasing the memory sequentially (i.e., a preceding event has to use and release the single unit of memory before a next event could use the same single unit of memory). The condition may impose that no two sequential allocate events occur without an intervening memory release event.

The associated rules 605c may indicate one or more rules that should also be considered if this grammar rule is triggered. For example, the rules 610 and 615 may be triggered following the triggering of rule 605 based upon associated rules 605c. The rules may be reciprocal and may or may not be recursive in depth. For example, when the rule 610 is triggered its associated rules may cause rule 605 to trigger. Rule 605 may then trigger rule 615 to fire, but without retriggering rule 610.

Figure 7:
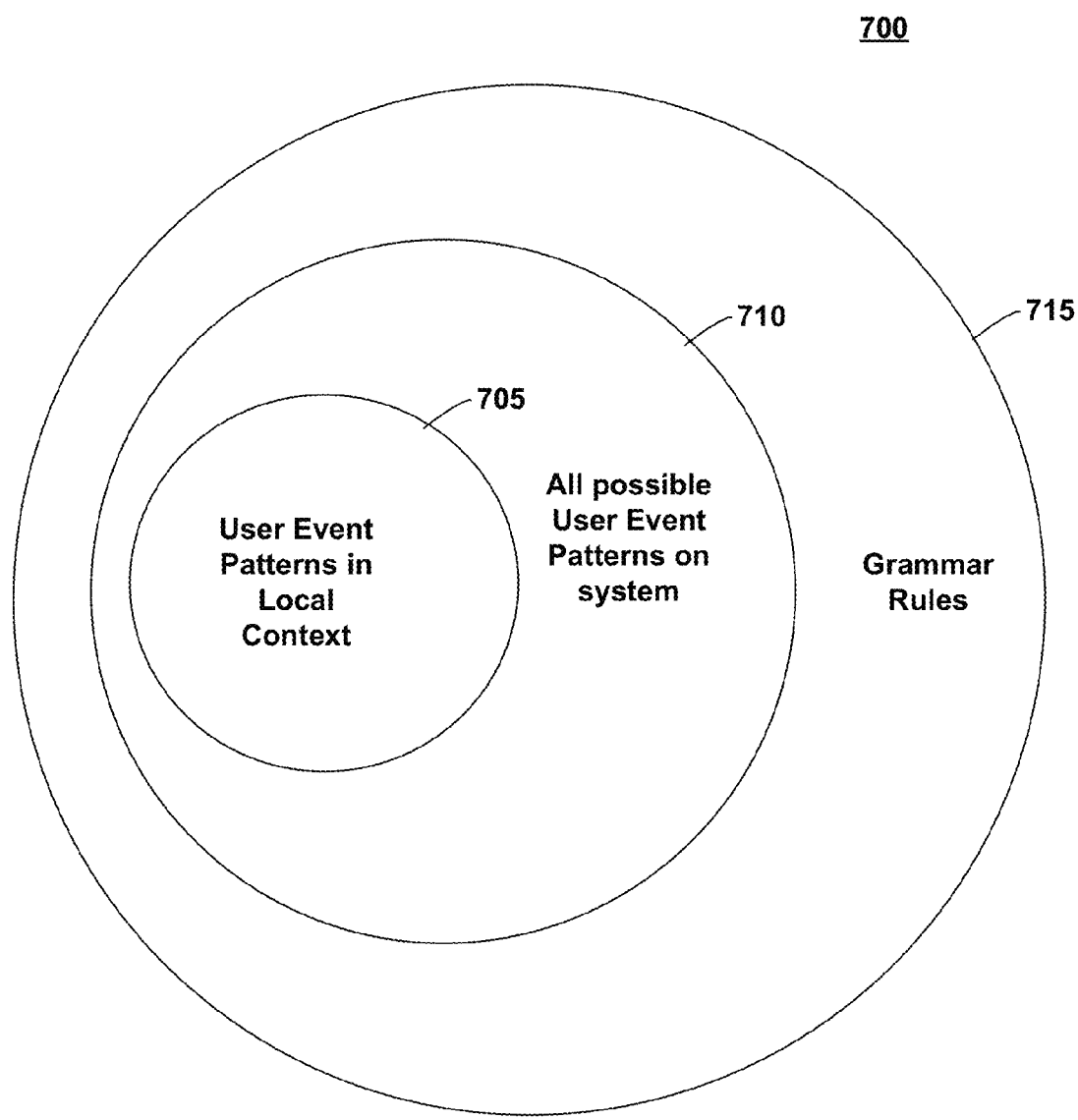
FIG. 7 is a Venn diagram illustrating the logical relations between various user operations and grammar rules, as may occur in some embodiments.

FIG. 7 is a Venn diagram 700 illustrating the logical relations between various user operations and grammar rules, as may occur in some embodiments. The set of "user event patterns in the local context" 705 may encompass all the events that a given user may be able to generate. The set "All possible events" 710 may encompass all the events that might reasonably be performed by any user on the system. The set 710 may be a superset of the set 705, e.g., where a particular user has fewer privileges and may perform less than all the operations available to certain other users. The grammar rules set 715 may encompass all the operations of the subsets 705 and 710, as well as possible additional operations as a precaution. Though depicted here as super and subsets, one will recognize that the sets may be equal in some embodiments and/or situations.

General Review Flow

Figure 8:
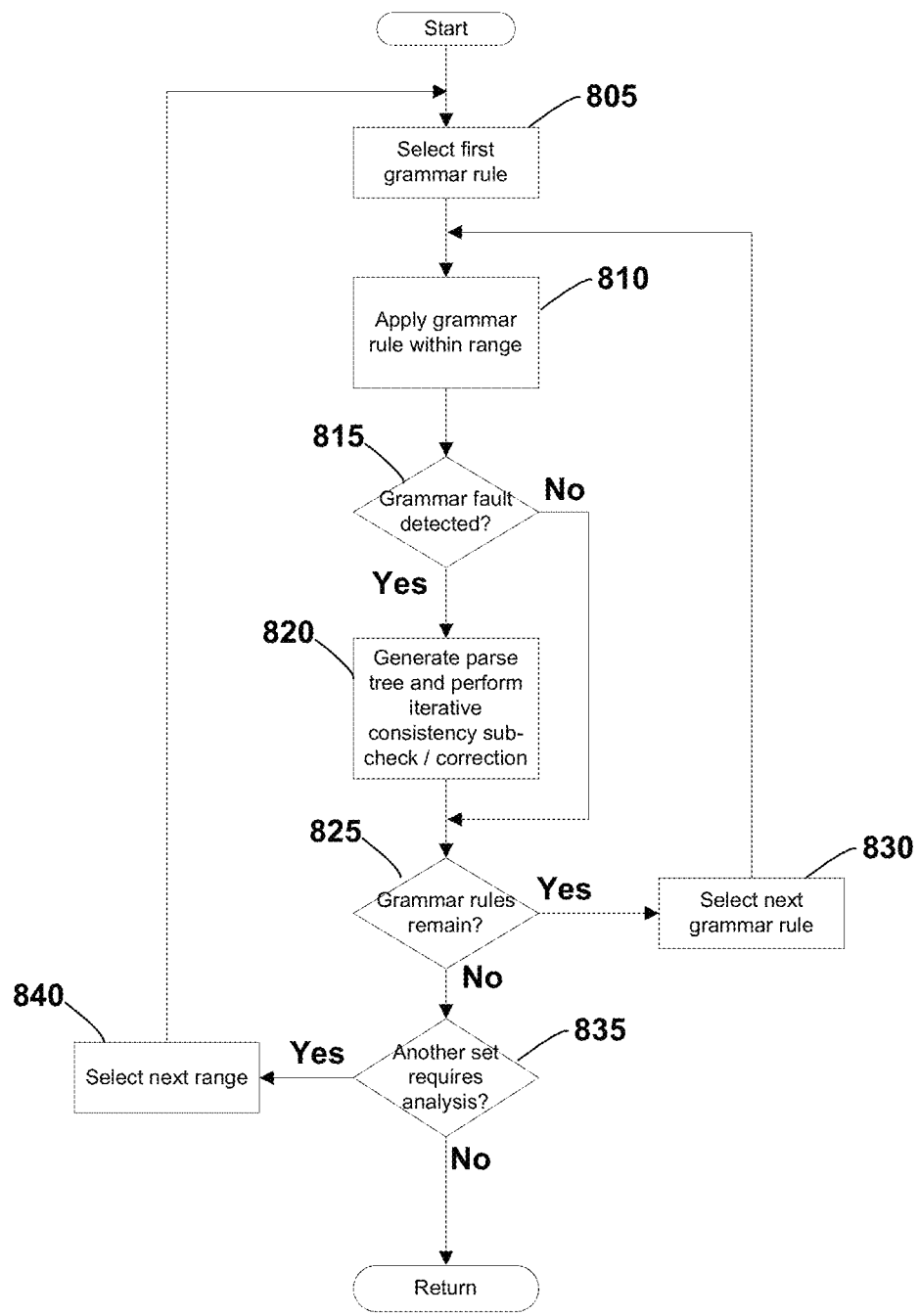
FIG. 8 is a generalized flow diagram, depicting application of a grammar rule to a range as may occur in some embodiments.

FIG. 8 is a generalized flow diagram 800, depicting application of a grammar rule to a range as may occur in some embodiments. At block 805 the system may select a first grammar rule. At block 810 the system may apply the grammar rule within a range of analysis. At block 815 the system may apply determine if a grammar fault was detected. In some embodiments, if a fault exists (e.g., a missing event) the system may generate a parse tree and proceed to iteratively traverse the rule and its associated triggered rules to identify what synthetic consequent and antecedent events to generate. At block 825 the system may determine if additional grammar rules have yet to be applied. If so, the next rule may be selected at block 830 and the process repeated.

At block 835 the system may determine if another set of events require analysis. If so the next range of events may be selected at block 840 and the process repeated. Otherwise the process may end.

Example Synthetic Event Insertion

Figure 9:
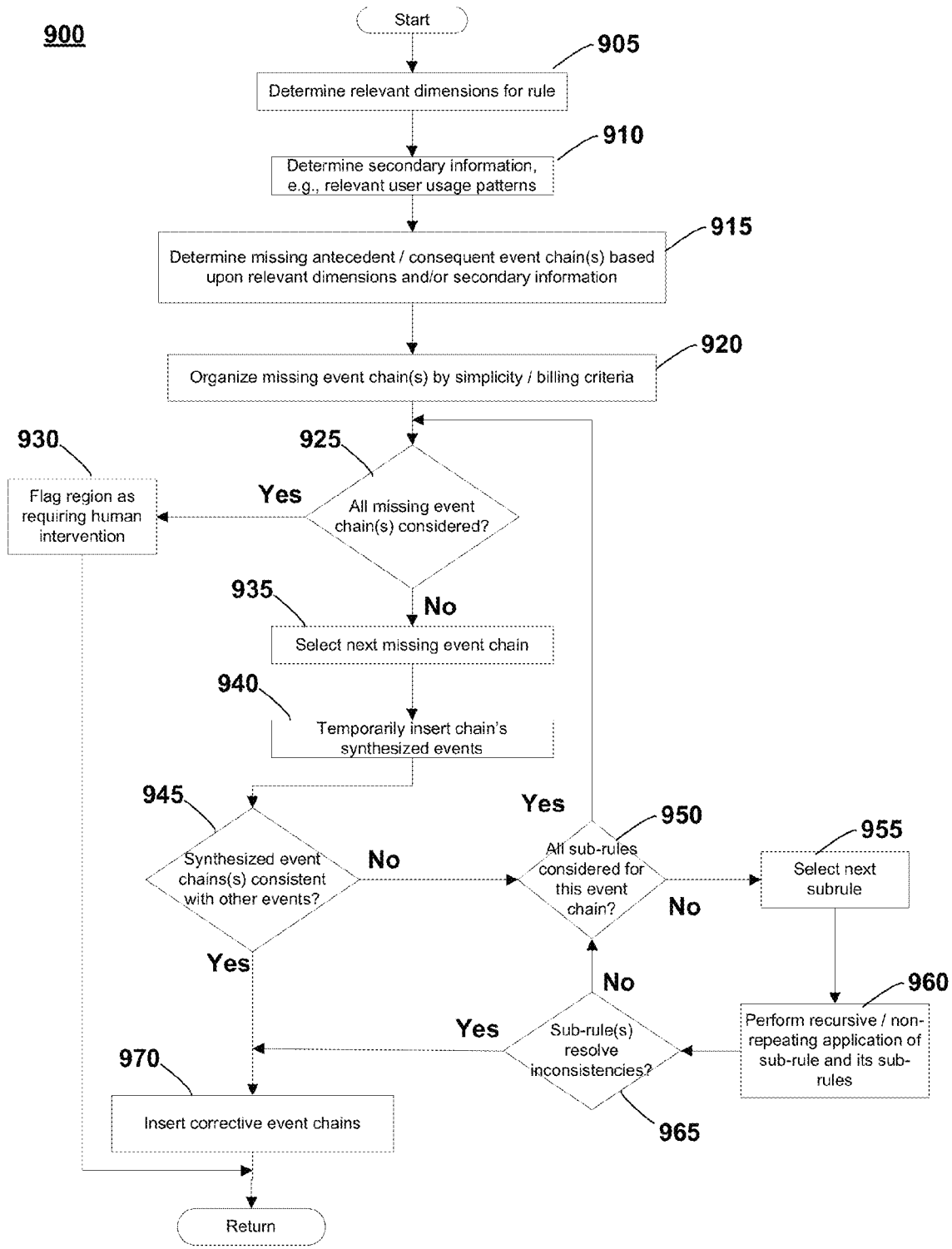
FIG. 9 is a generalized flow diagram, depicting creation of synthetic event chains for a grammar rule, as may occur in some embodiments.

FIG. 9 is a generalized flow diagram, depicting a process 900 for creation of synthetic event chains for a grammar rule, as may occur in some embodiments. For example, these steps may occur in relation to block 820. As depicted above in FIGS. 3 and 4 more than one synthetic event may be generated and synthetic events may themselves generate additional synthetic events as part of one or more grammar rules. At block 905, the system may determine the dimensions for a rule (e.g., relevant time constraints, memory constraints, etc.). At block 910, the system may determine any relevant secondary information, e.g., user usage patterns, that may be used, possibly in conjunction with the dimension constraints, to identify an appropriate synthetic event and to determine an appropriate timestamp.

At block 915, the system may determine the missing antecedent or consequent event chain or chains based upon the relevant dimensions and/or secondary information. The system's capacity may determine the relevant dimensions to consider. For example: 1) banking transactions may be limited to the account's credit line limit; 2) memory transactions on a computer system (allocate-release) may be limited by available memory; and, 3) Open-Close a file transactions may be limited by a maximum open files limit of an Operating System.

A single grammar rule may have more than one possible solution (e.g., more than one event chain). But even a single grammar rule having a single solution chain may reference other rules. The event chain(s) of these other referenced rules may also be iteratively considered with their parent rule (possibly in the same manner as if the parent rule had multiple event chains itself).

At block 920, the system may organize the missing event chain or chains by simplicity, by billing criteria, or by any other pertinent metric.

At block 925, the system may determine if all the missing event chain(s) have been considered. In some embodiments, the triggering of a grammar rule may result in a single parse tree reflecting the sequence of synthetic and normal events that should follow. Accordingly, in some embodiments block 925 may simply identify the correct location for the one or more events yet to be synthesized.

If the events have all been considered, and no solution has been found, the system may flag the region as requiring human intervention at block 930. Where the grammar rules comprise a superset, as depicted in FIG. 7, e.g., a suitable event chain should always be identified. If a chain is not identified, it may indicate a more serious error (e.g., false generation of events) in the recording system.

Where more chains exist in the grammar rule, the system may continue to block 935 where the next chain is selected. At block 940, the chain's synthesized consequent and antecedent events may be inserted. At block 945, the system may determine if the inserted chain(s) result in a consistent log. If they do not, then alternative sub-rules referenced by this rule may be considered at block 950. If no other subrules exist, then the system may attempt to apply another chain at block 925. If a subrule exists, at block 955, the system may select the sub grammar rule and may perform a recursive application of the subrule and its subrules at block 960 seeking to identify a suitable chain. If at block 965, no suitable sub-rule has been identified, then another subrule may be considered at block 950.

Once a suitable chain has been identified has been identified, the synthesized events may be inserted at block 970, and the process returns to consider the next grammar rule to be applied to the region, or to end if no grammar rules remain for consideration.

Example Grammar Rule Application

Figure 10:
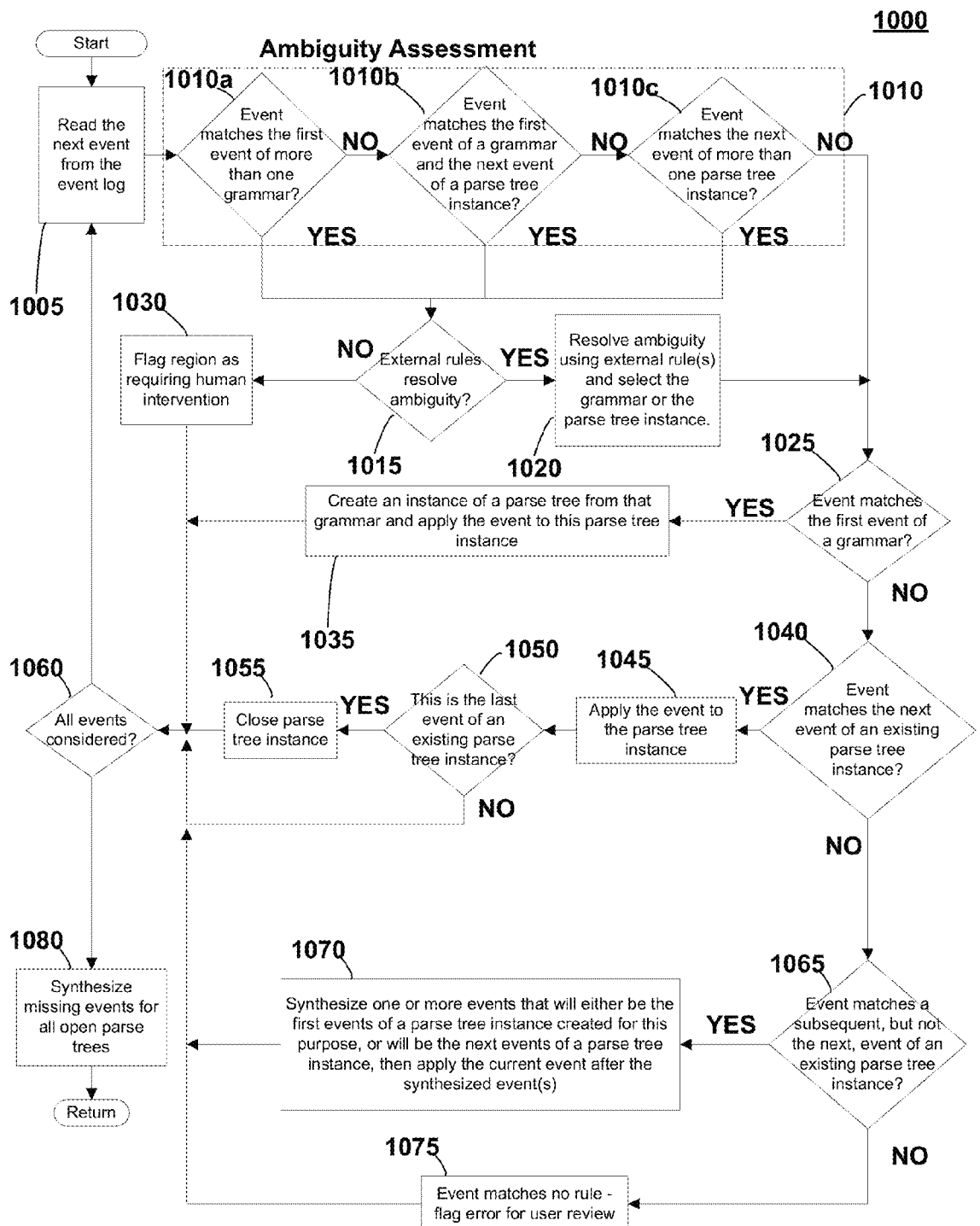
FIG. 10 is a generalized flow diagram, depicting application of grammar rules to an event log as may occur in some embodiments.

FIG. 10 is a generalized flow diagram, depicting a process 1000 for application of grammar rules to an event log as may occur in some embodiments. Generally, the system may iterate through normal and/or synthesized events to identify applicable grammar rules. Once a grammar rule is activated, a parse tree may be generated and successive synthesized events used to populate the parse tree. By completing parse trees, or identifying situations where this is not possible, the system may complete the lacuna in the event log record and/or flag a human user to an unresolvable peculiarity.

At block 1005, the system may read the next uncorrupted event from the event log.

Blocks 1010a-c may reflect an ambiguity assessment 1010 to determine whether the current application of one or more grammar rules results in ambiguity. The order and tests here are merely exemplary and one will readily recognize variations. At block 1010a the system may determine if the event under consideration matches more than one grammar rule. At block 1010b the system may determine if the event matches both the event of a grammar rule and the next expected event in a previously generated parse tree instance. At block 1010c the system may determine that the event matches the next expected event in more than one parse tree instance. In some embodiments, block 1010c may not be a cause for ambiguity where the parse trees are arranged in a total order of priority or otherwise designed to accommodate events applying to multiple parse tree instances.

Where any of the ambiguity assessment 1010 considerations are triggered, the system may resolve the ambiguity using external rules at block 1015. An external rule may describe a characteristic of a system that should not be violated during event restoration. For example, an external rule could be capacity related such as available memory on a computer system, bandwidth of a network device, a credit line limit on a bank account, etc.

If external rules cannot be used to resolve the ambiguity, at block 1030 the system may flag the event sequence as being in need of human intervention. Conversely, if the ambiguity can be resolved using an external rule, then the external rules will be applied and the appropriate grammar/parse tree instances identified. As described herein (e.g., with reference to available memory), an external rule may resolve ambiguity based upon a characteristic of the system.

At block 1025, the system may determine if the event matches a first event of a grammar. Matching of the first event may trigger the grammar, resulting in the creation of a new parse tree instance at block 1035. The event may be used to populate the first event of the new parse tree instance.

If the event does not match a first event of a grammar at block 1025, then at block 1040 the system may determine if the event matches the next event of an existing parse tree instance. If the event matches, then at block 1045, the system may apply the event to the parse tree instance (e.g., populate the next available missing event with this event). If, as indicated at block 1050, this is the last event of the parse tree instance, the parse tree instance is closed at block 1055 and removed from subsequent consideration (although another instance of the parse tree for the same rule that generated this parse tree instance may be subsequently, or contemporaneously, generated).

If the event does not match the next expected event in any parse tree instance at block 1040, then at block 1065 the system may look ahead and determine if the event matches a subsequent, but not the immediately next, event in an existing parse tree instance. If the event matches a subsequent missing event in a parse tree instance, then at block 1070 the system may synthesize one or more events preceding the matched missing event. Conversely, if no matching events are identified in the parse trees at block 1065 then at block 1075 the system may flag the lack of matches for user review.

As indicated at block 1060, the process may continue iteratively until all normal (and in some embodiments synthesized) events have been considered. In some embodiments, the system proceeds chronologically through each of the events.

When all the normal events have been considered, at block 1080 the system may synthesize any outstanding events for all the open parse trees, before completing the review.

Example Event Resolution with Missing Event Synthesis—Overview

Figure 11:
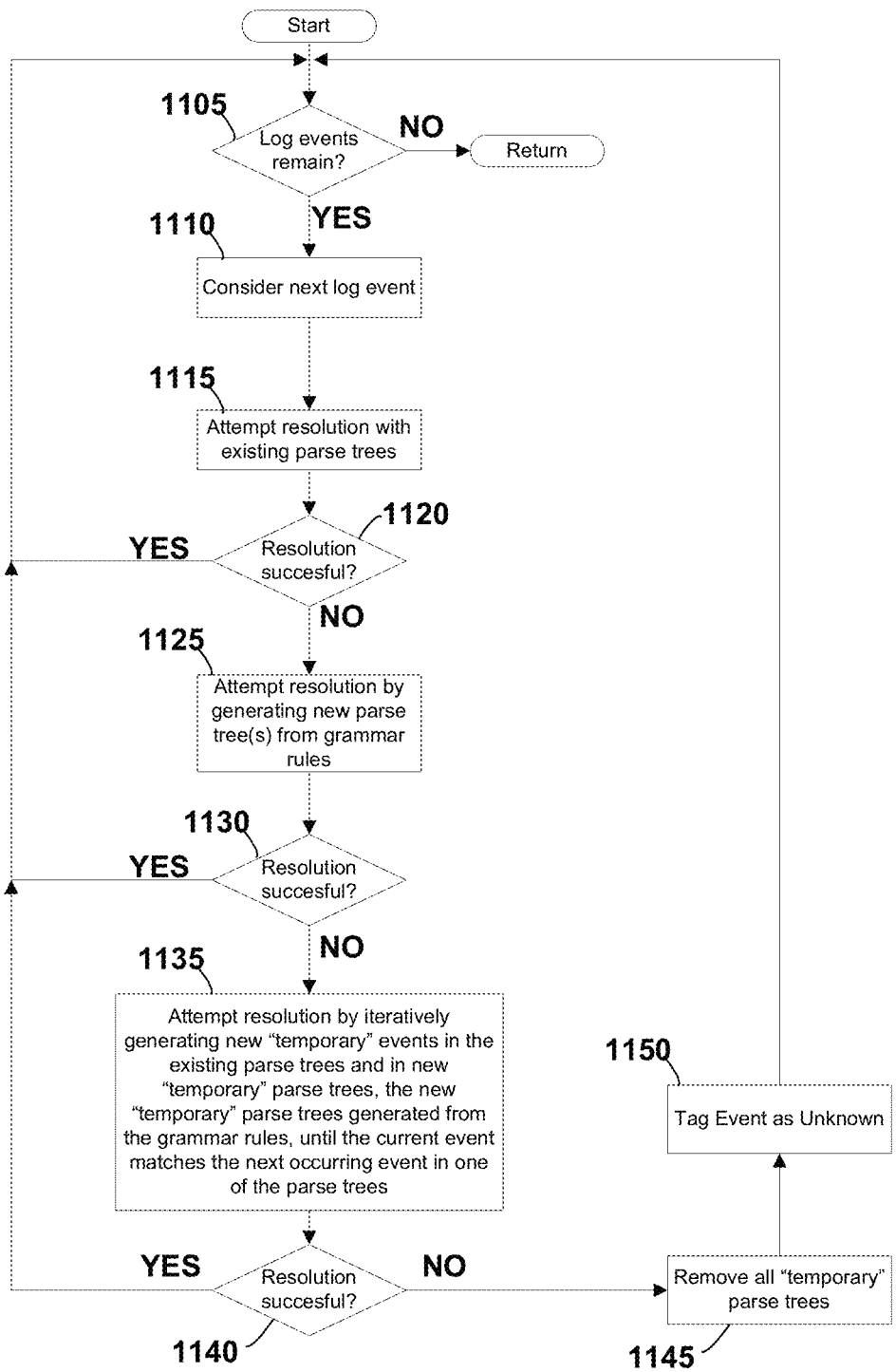
FIG. 11 is a generalized flow diagram summarizing, at a high level, the operations to be described in greater detail in the example method of FIG. 12.
Figure 12:
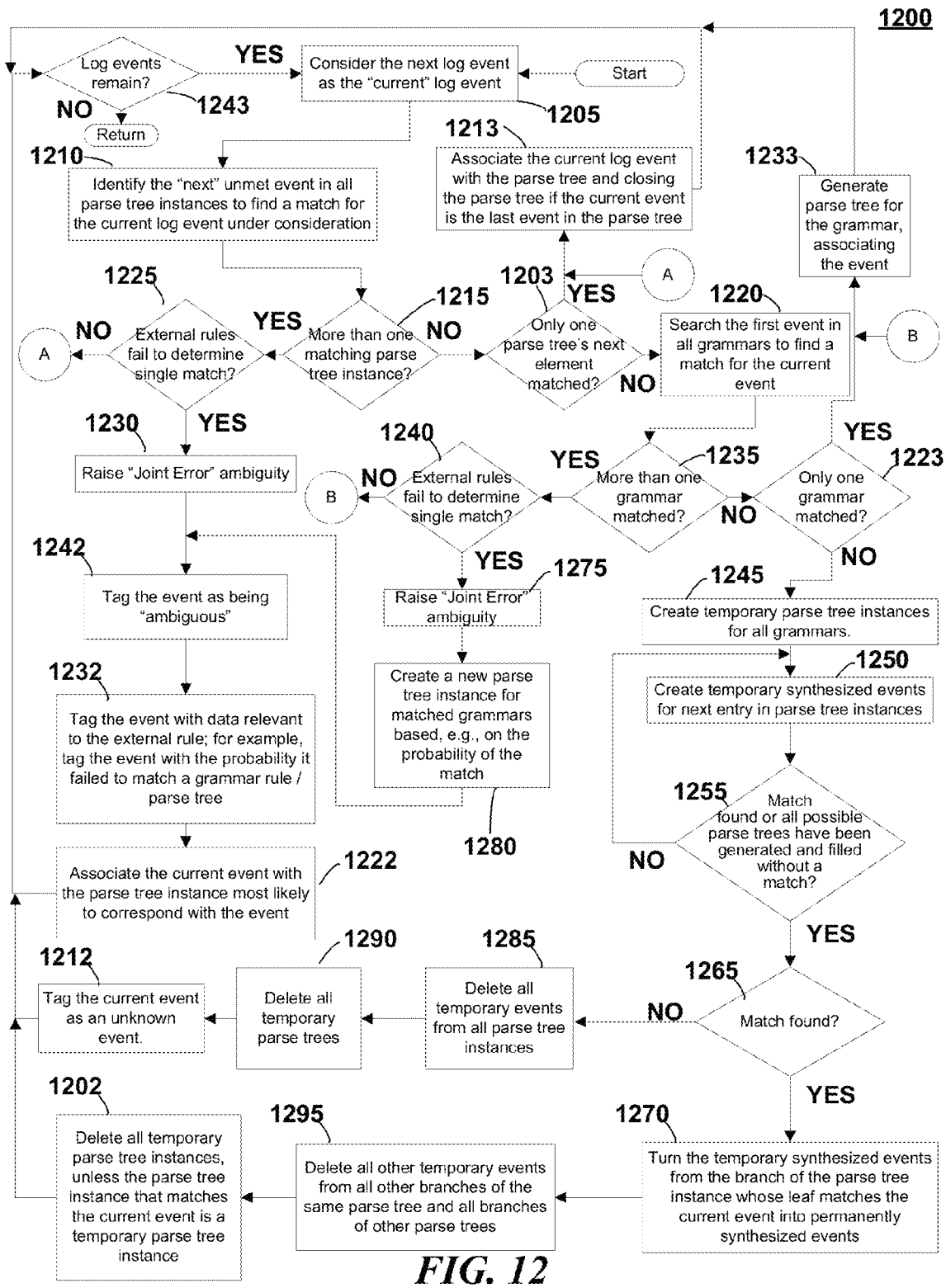
FIG. 12 is a generalized flow diagram, depicting an example method for resolving events when applying grammar rules to an event log, as may occur in some embodiments.

FIG. 11 is a generalized flow diagram summarizing, at a high level, the operations to be described in greater detail in the example method of FIG. 12. At block 1105, the system may determine if events in the log remain for consideration. Block 1105 may generally correspond to the operation at block 1243 in FIG. 12. At block 1110, the system may consider the next log event. Block 1110 may generally correspond to the operation at block 1205 in FIG. 12.

At block 1115, the system may attempt to resolve the current event based upon the existing parse trees created based on previously matched grammar rules. Block 1115 may generally correspond to the operations at blocks 1210, 1215, 1203, 1213, 1225, 1230, 1242, 1232, and 1222 in FIG. 12.

At block 1120, the system may consider if block 1115 succeeded. Block 1120 may generally correspond to block 1203 in FIG. 12.

If block 1115 did not succeed in resolving the event, the system may transition to block 1125. At block 1125 the system may attempt to resolve the event by seeing if the event matches any grammar rules. If a match exists, a new parse tree for the grammar rule, referencing the event, may be generated. Block 1125 may generally correspond to the operations at blocks 1220, 1235, 1223, 1233, 1240, 1275, 1280, 1242, 1232, and 1222 in FIG. 12.

At block 1130, the system may determine if block 1125 was successful in determining a resolution. Block 1130 may generally correspond to block 1203 in FIG. 12.

If the system did not resolve the event at block 1125, at block 1135 the system may attempt to resolve the event by iteratively generating "temporary" parse trees from the grammar rules and/or existing parse trees until one or more matches are found. Block 1135 may generally correspond to the operations at blocks 1245, 1250, 1255, 1265, 1270, 1295 and 1202 in FIG. 12.

At block 1140, the system may determine whether the iterative "temporary" parse tree generation succeeded in resolving the event. Block 1140 may generally correspond to block 1265 in FIG. 12. If the event was not resolved, then at block 1145 the system may remove the "temporary" parse trees (corresponding to blocks 1285 and 1290) and tag the event as "unknown" at block 1150 (corresponding to blocks 1212).

The following, more detailed description in FIG. 12 will be understood to be merely an example of the more generalized operations discussed above with reference to FIG. 11. One will recognize that different design choices may be made in the implementation of FIG. 12 and that the depicted operations may be performed in a different order and in a different manner while achieving substantially the same effect.

Example Event Resolution with Missing Event Synthesis—Detailed Example

FIG. 12 is a generalized flow diagram, depicting an example process 1200 for resolving events when applying grammar rules to an event log, as may occur in some embodiments.

At block 1205, the system may consider the next event in the log(the "current" log event). At block 1210, the system may search the next event in each of the outstanding parse tree instances to identify a missing event corresponding to the current event in the event log under consideration. For example, if there are three open parse trees (A, B, C), each expecting 5 events, with events 1-3, 1-2, and 1-4 met for each tree respectively, the system will now consider the $4^{th}$, $3^{rd}$, and $5^{th}$ respective events in each tree A, B, C.

At block 1215, the system may determine more than one parse tree has a missing event matching the event under consideration (e.g., both event 4 and event 3 of trees A and B match). If so, the system may attempt to resolve the ambiguity at block 1225 using external rules, raising a "Joint error" ambiguity flag at block 1230 should they fail. Where they succeed, the parse tree identified by the external rules (which may be a new parse tree synthesized from a grammar) may be associated with the current event at 1213.

Where the external rules have failed, at block 1242, the system may tag the event as being "ambiguous not synthesized", or otherwise indicate that the external rules failed to resolve the event (e.g., indicate that the event is to be reviewed by the user, to avoid the event's consideration as a normal event by a subsequent iteration, etc.). Blocks 1230, 1242, 1232, and 1222 are generally directed to a process for selecting an appropriate parsing tree based on a probability that the event corresponds to an external rule and to tag the event appropriately based upon the probability.

At block 1232, the system may tag the event with data relevant to the external rule. For example, the system may determine, based on the external rules, that the event is most likely associated with a particular parse instance. This probability may be included with metadata for the event so that an auditor may subsequently verify the legitimacy of the determination. At block 1222, the system may associate the event to the parse tree instance (in some embodiments by inserting the event into the parse tree, while in other embodiments, by simply noting the likelihood of the association in the event's metadata). At block 1222 the event may be associated with only a single parse tree instance that the external rules indicate as having the highest probability of association.

If instead, at block 1215, the system does not match more than one parse tree instance, then at block 1203 the system may determine if only one parse tree matched (e.g., only the $4^{th}$ event of tree A). If so, at block 1213, the system may associate the current log event with the parse tree and continue with consideration of the next log event at block 1243 if there is one.

If no parse trees apply to the current log event then the system may consider whether any new grammar rules apply. At block 1220 the system may search the first event in all the grammar rules to identify a match for the current event. Where ambiguity results as a consequence of multiple grammar rules' first elements matching at block 1235 the system may again consult external rules at block 1240 and raise a "joint error" ambiguity flag if necessary at block 1275. At block 1280, the system may create a new parse tree instance for a matched grammar indicated by an external rule.

For example, an external rule regarding memory capacity may be applicable here. If there are N memory allocation events for different amounts of memory without memory release events, there may be N open parsing trees. Finding which parsing tree to apply a "release memory" (missing) event first may be determined based upon a memory allocation calculation. There may be more than one way to restore release memory events. In this case, there may be multiple possible scenarios, e.g.: a) optimistic (the least memory is used); b) pessimistic (all memory is used); c) averaged based on previous memory usage patterns of the system; etc.

At block 1223, the system may consider whether only a single grammar rule matched. If so, at block 1233 the system may generate a new parse tree for the grammar, associating the event with the grammar. The system may then continue with consideration of the next log event at block 1243 if additional events in the log exist. As an example of a single matching between a single grammar rule and the current event, consider an "Open File" event. This may be the first event in a grammar. If the event was successfully matched, then transition to 1233 is appropriate. However, if the current event were instead a "Next" or "Last" event of the grammar, and an appropriate existing parsing tree was not previously identified, then the system may transition to 1245. For example, a "Close File" event may be the last, rather than the first, occurring event in the grammar. Ideally, a parsing tree would have been earlier identified with an "Open File" event. However, if the "Open File" event is missing then the system will seek to implement the missing, preceding events via 1245 and the subsequent blocks. Thus, transition to block 1245 may generally reflect a more severe corruption of the event log.

Though not depicted in FIG. 12, at block 1223 the system may also consider whether the current event fails to match any event in any of the grammars. In this situation, the system may raise a "Missing grammar error" and proceed to block 1243, rather than attempt a synthesized match by proceeding to block 1245.

Where none of the first events in any of the grammar rules have been found to match, the system may synthesize "temporary" events in each parse entry and "temporary parse trees" from unused grammars to determine if the currently considered log event is to appear after one or more events that, e.g., have been removed from the log. At block 1245 the system may create temporary parse tree instances for all the grammars (in some embodiments only those grammars not already associated with existing parse tree instances). That is, the system may recognize that the current event applies to a grammar that has not yet been activated, but appears sometime after the first event appearing in the grammar.

At block 1250 the system may introduce a "synthesized event" into the next expected event of each parse tree. For example, there may be intervening events that have been removed from the log. The synthesized events allow the system to consider the potential existence of these missing events when identifying a match for the current log event. At block 1255, the system may perform a recursive search until the parse tree instances (both preexisting and newly created) are filled with as many temporary synthesized events as can be generated, or until the current log event has been found to match an unmet parse tree event. For example, the temporary parse trees' leaves may be considered until a match to the current event is found. Note that when a match is found for one parse tree, there may be many other unmatched parse trees with one or more synthesized events. Thus, the iterative consideration of blocks 1250 and 1255 may consider multiple applicable grammars and the events occurring at multiple positions throughout the grammars/parse trees. Note that the creation of some parse trees may consider events occurring prior in time, e.g., as discussed above with respect to the antecedent event 530 (which may be a faux or a genuinely missing event) in, e.g., an atomized log(similar procedures may occur in a sequential log).

Though block 1255 is shown returning to block 1250 for ease of understanding, one will recognize that in some embodiments the system may repeat the preceding blocks of the depicted algorithm when considering the synthesized parse trees and events. For example, at each iteration the system may again consider the number of matching parse trees at block 1215 and the application of the external rules at block 1225. Similarly, external rules may be considered at block 1245 as they were at block 1240.

At block 1265, the system may determine if all the parse tree instances are filled with temporary synthesized events and a match for the current event still cannot be found. If no match was found, then at block 1285 the system may delete all the temporary events in the parse tree instances, delete all the temporary parse trees at block 1290, and flag the current event as an "unknown event" at block 1212, potentially in need of further user review.

If instead, a match was found at block 1265, then at block 1270 the system may convert the temporary synthesized events for the matching parse tree into permanent synthesized events. At block 1295 the, the temporary events from the other branches of the same parse tree, and all other parse trees, may be removed. At block 1202, all the temporary parse tree instances save the matching one may likewise be removed. The temporary events associated with the successful match, however, may be converted to permanently synthesized events that may represent a partial or complete parsing tree. Where the successful match is only a partially complete parsing tree, the "unfinished" tree may be considered during the next iteration of the algorithm for the next log event. If unfinished parse trees remain after all the log events have been considered, the system may synthesize the remaining events in the parse tree (assuming, e.g., that the events were lost in the log). Note that while the above description refers to the synthesized parse trees as "missing", pursuant to the embodiments presented above, one will recognize that the system may synthesize parse trees from grammar rules that may be unlikely to resemble actual events from the original transactions, but which may quickly identify a suitable match within the reviewer's business constraints (e.g., where the artificial match is equivalent for billing purposes to the actual match).

Computer System

Figure 13:
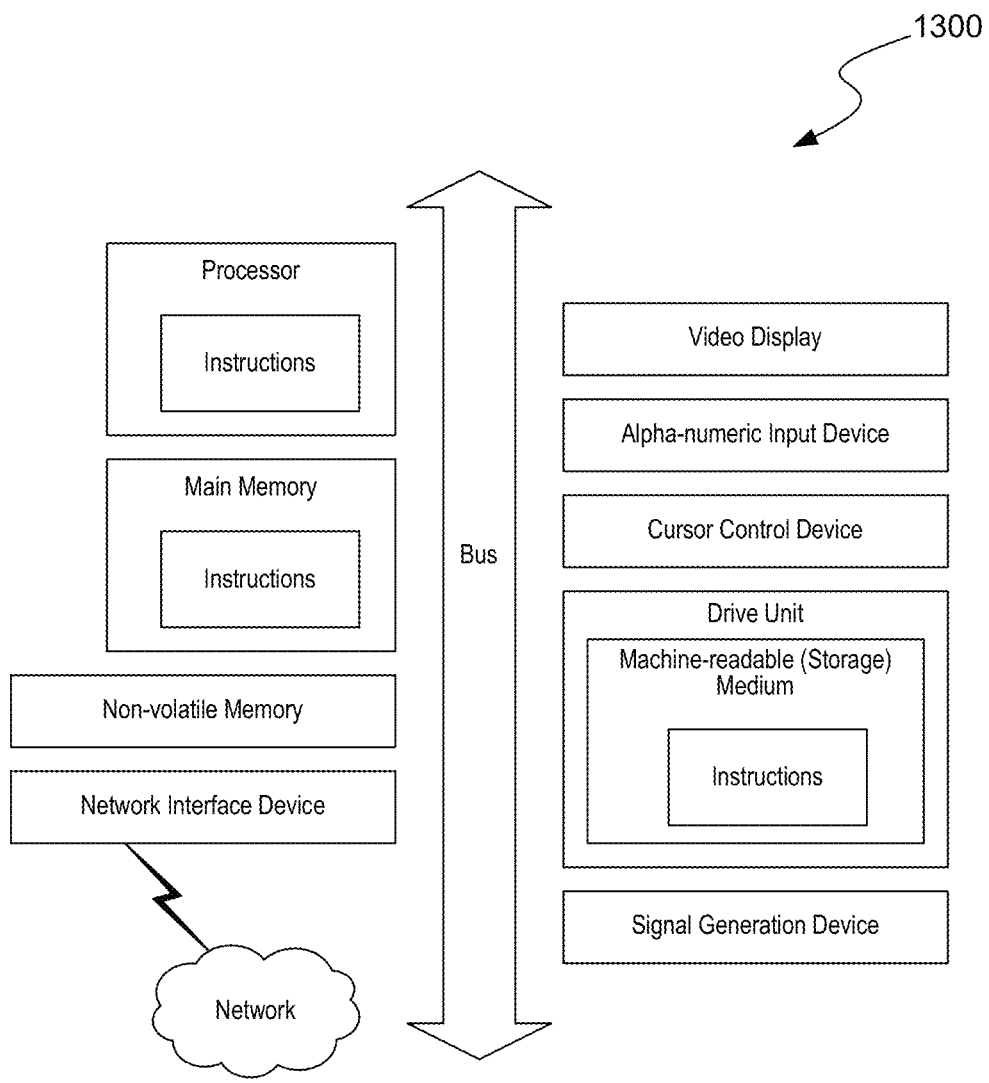
FIG. 13 shows a diagrammatic representation of a machine in the example form of a computer system within which a set of instructions for causing the machine to perform one or more of the methodologies discussed herein may be executed.

FIG. 13 shows a diagrammatic representation of a machine 1300 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1300 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Remarks

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A computer-implemented method for analyzing an event long, comprising:
   retrieving a first event from the event log;
   determining that the first event matches a portion of a first grammar rule;
   generating a parse tree associated with the first grammar rule;
   retrieving a second event from the event log;
   determining that the second event matches a portion of the parse tree; and
determining that at least one intervening event occurs in the parse tree between the first event and the second event; and
   generating a synthesized event and inserting the synthesized event into the event log, the synthesized event associated with a time between a time associated with the first event and a time associated with the second event.

2. The computer-implemented method of claim 1, wherein determining that the first event matches a portion of a first grammar rule comprises:
iteratively searching through each of the remaining events in the event log to generate a plurality of parse tree instances having temporary synthesized events, for each iteration:
creating temporary synthesized events for the next expected event in each of the parse tree instances;
creating temporary parse tree instance for all grammars; and
synthesize the first event of each parse tree instance;
determining that a match for the first event exists among the plurality of parse tree instances having temporary synthesized events, the match corresponding to the first grammar rule.

3. The computer-implemented method of claim 1, wherein the first grammar rule is one of a plurality of grammar rules, the plurality of grammar rules comprising the same set or a superset of all possible user event patterns occurring in the event log.

4. The computer-implemented method of claim 1, the method further comprising:
determining that the first event matches a portion of a second grammar rule; and
applying an external rule to determine that the first grammar rule shall be applied.

5. The computer-implemented method of claim 4, wherein the external rule considers a pattern of events in the event log prior to the first event.

6. The computer-implemented method of claim 1, wherein the event log is an atomized event log.

7. A non-transitory computer-readable medium comprising instructions configured to cause a computer system to perform a method comprising the steps:
retrieving a first event from an event log;
determining that the first event matches a portion of a first grammar rule;
generating a parse tree associated with the first grammar rule;
retrieving a second event from the event log;
determining that the second event matches a portion of the parse tree; and
determining that at least one intervening event occurs in the parse tree between the first event and the second event; and
generating synthesized event and inserting the synthesized event in the event log, the synthesized event associated with a time between a time associated with the first event and a time associated with the second event.

8. The non-transitory computer-readable medium of claim 7, wherein determining that the first event matches a portion of a first grammar rule comprises:
iteratively searching through each of the remaining events in the event log to generate a plurality of parse tree instances having temporary synthesized events, for each iteration:
creating temporary synthesized events for the next expected event in each of the parse tree instances;
creating temporary parse tree instance for all grammars; and
synthesize the first event of each parse tree instance;
determining that a match for the first event exists among the plurality of parse tree instances having temporary synthesized events, the match corresponding to the first grammar rule.

9. The non-transitory computer-readable medium of claim 7, wherein the first grammar rule is one of a plurality of grammar rules, the plurality of grammar rules comprising the same set or a superset of all possible user event patterns occurring in the event log.

10. The non-transitory computer-readable medium of claim 7, the method further comprising:
determining that the first event matches a portion of a second grammar rule; and
applying an external rule to determine that the first grammar rule shall be applied.

11. The non-transitory computer-readable medium of claim 10, wherein the external rule considers a pattern of events in the event log prior to the first event.

12. The non-transitory computer-readable medium of claim 7, wherein the event log is an atomized event log.

13. A computer system comprising:
at least one processor;
at least one memory comprising instructions configured to cause the at least one processor to cause the computer system to perform a method comprising the steps:
retrieving a first event from an event log;
determining that the first event matches a portion of a first grammar rule;
generating a parse tree associated with the first grammar rule;
retrieving a second event from the event log;
determining that the second event matches a portion of the parse tree; and
determining that at least one intervening event occurs in the parse tree between the first event and the second event; and
generating synthesized event and inserting the synthesized event in the event log, the synthesized event associated with a time between a time associated with the first event and a time associated with the second event.

14. The computer system of claim 13, wherein determining that the first event matches a portion of a first grammar rule comprises:
iteratively searching through each of the remaining events in the event log to generate a plurality of parse tree instances having temporary synthesized events, for each iteration:
creating temporary synthesized events for the next expected event in each of the parse tree instances;
creating temporary parse tree instance for all grammars; and
synthesize the first event of each parse tree instance;
determining that a match for the first event exists among the plurality of parse tree instances having temporary synthesized events, the match corresponding to the first grammar rule.

15. The computer system of claim 13, wherein the first grammar rule is one of a plurality of grammar rules, the plurality of grammar rules comprising the same set or a superset of all possible user event patterns occurring in the event log.

16. The computer system of claim 13, the method further comprising:
determining that the first event matches a portion of a second grammar rule; and
applying an external rule to determine that the first grammar rule shall be applied.

17. The computer system of claim 16, wherein the external rule considers a pattern of events in the event log prior to the first event.

18. The computer system of claim 13, wherein the event log is an atomized event log.

* * * * *